United States Patent [19]

Boardman et al.

[11] Patent Number: 4,755,204

[45] Date of Patent: Jul. 5, 1988

[54] MANUFACTURE OF CURVED GLASS SHEETS

[75] Inventors: James Boardman, King Norton; Willem Wiechers, Ormskirk, both of England

[73] Assignee: Pilkington Brothers P.L.C., St. Helens, England

[21] Appl. No.: 16,097

[22] Filed: Feb. 18, 1987

[30] Foreign Application Priority Data

Feb. 20, 1986 [GB] United Kingdom ................. 8604246

[51] Int. Cl.⁴ ........................................... C03B 23/023
[52] U.S. Cl. ....................................... 65/107; 65/106; 65/273; 65/285
[58] Field of Search ................. 65/285, 107, 273, 106

[56] References Cited

U.S. PATENT DOCUMENTS

| | | | |
|---|---|---|---|
| 2,671,988 | 3/1954 | Walters | 65/273 |
| 3,123,344 | 3/1964 | Ross | 263/6 |
| 3,431,095 | 3/1969 | Ross | 65/285 X |

FOREIGN PATENT DOCUMENTS 0132701 2/1985 European Pat. Off. .
59-64536 4/1984 Japan .

Primary Examiner—Arthur Kellogg
Attorney, Agent, or Firm—Burns, Doane, Swecker & Mathis

[57] ABSTRACT

Curved glass is maufactured by supporting glass on a sag bending mould which is passed through a furnace. During initial heating of the glass on the mould, hot air is directed around the mould beneath the glass to minimize the temperature difference between the mould and the glass.

13 Claims, 3 Drawing Sheets

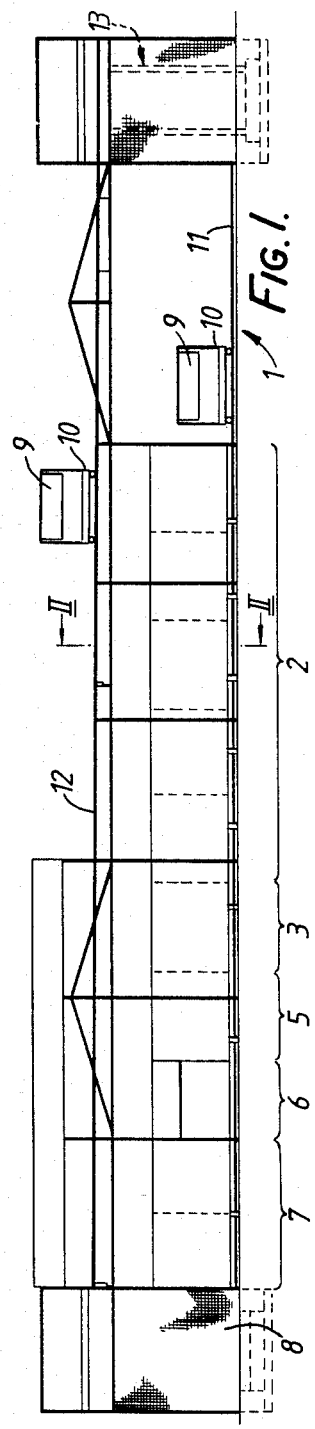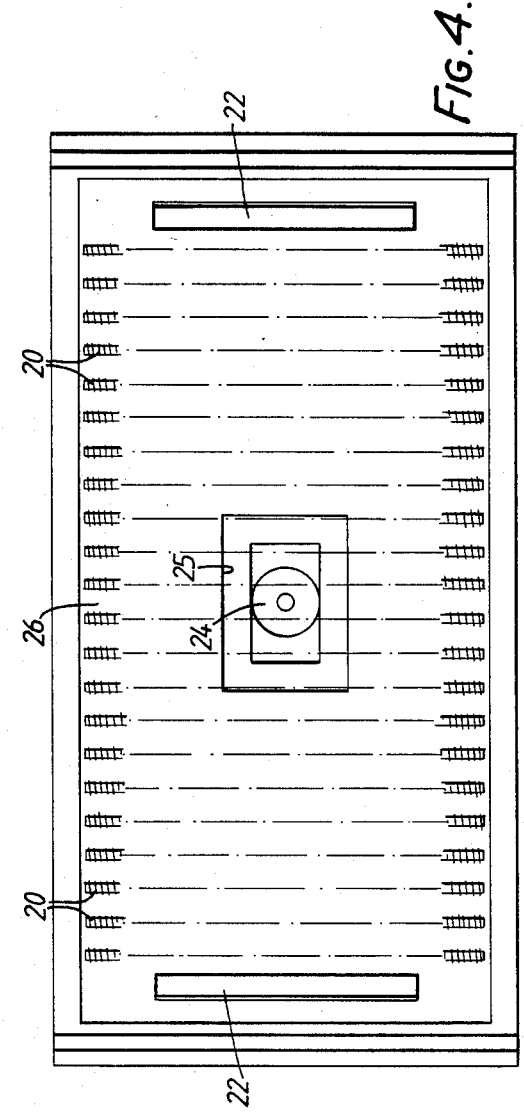

MANUFACTURE OF CURVED GLASS SHEETS

BACKGROUND OF THE INVENTION

This invention relates to the manufacture of curved glass. More especially the invention relates to a method and apparatus for manufacturing curved glass sheets which are to be used in the manufacture of vehicle windscreens. In particular the invention relates to a method and apparatus for sag-bending pairs of glass sheets which are to be laminated together to produce a vehicle windscreen.

It is known to produce curved glass, such as a single glass sheet for use as a vehicle windscreen, or a pair of glass sheets which are to be laminated together to produce a vehicle windscreen, by supporting the glass on a sag bending mould which is passed through a furnace where it is heated to bending temperature and sags to conform to the shape of the mould.

It has been customary to mount each mould on a carriage which may include a box in which the mould is located, to load each mould with one or a pair of glass sheets at a loading/unloading station and then to advance a succession of loaded carriages through heating sections of a tunnel furnace having roof heaters. Each carriage is stationary at each heating section for a preset time. The glass is gradually heated to a sag bending temperature, for example 590° C. to 610° C., by the time it reaches the hottest section of the furnace, where the glass sags to the shape of the mould and attains a required configuration before being removed for cooling. Cooling continues as the carriage is transferred back to the loading/unloading station, where the cooled bent glass is removed and glass to be bent is loaded on to the mould.

The carriages are circulated step-wise around a continuous path which includes the tunnel furnace. This path may be in the form of a horizontal loop around which the carriages are carried back to the loading/unloading station. In other arrangements the carriages removed from the hot end of the furnace may be raised by a lift to a return run above the furnace roof and then lowered to the unloading/loading station, or the carriages may be lowered from the hot end of the furnace to a return run beneath the furnace and then lifted back to the loading/unloading station.

Furnaces of this kind are described in GB-A-No. 1 299 384, GB-A-No. 1 310 670 and EP-A-No. 0 132 701.

In the manufacture of laminated windscreens for vehicles flat glass sheets are cut to the required external shape to suit the styling of the vehicle. These glass sheets are then loaded in pairs on to sag bending moulds at the loading/unloading station. Each sag bending mould usually has lateral members with upper curved edges shaped to determine the final curvature to which the glass sheets sag. When the end parts of the sheets are to have a substantial curvature to match the styling of a vehicle, the mould has pivoted wing pieces which pivot upwardly under the influence of the weight of the sagging glass to conform the ends of the glass to the required windscreen shape.

When the cold flat glass is loaded on to the sag bending mould the glass has a limited number of points of contact with the mould, notably the upper ends of the lateral mould members and the predominant points of any wing pieces. It has been observed that these points of contact are points where damage can occur to the lower glass surface. In general these points of contact lie near to the edges of the glass, and can cause breakage during the glass bending operation or during subsequent processing of the glass. Even if breakage does not occur there may be unacceptable flaws in the glass surface. The damage is due to a combination of sliding contact between the metal mould and the glass surface, causing minor scratching, and tensile stresses induced in the glass surface by the thermal gradient between the generally warm glass and the cold spot caused by localised contact with the mould. The tensile stresses tend to cause propagation of cracks from the minor scratches. Further damage may occur at other points as the hot glass sags onto the colder mould during the final stages of the bending.

This invention is based on the discovery that reduction in the temperature differential between the mould members and the glass during heating of the glass, particularly the initial stages of heating of the glass, results in a reduced temperature differential being maintained throughout the sag bending process, thereby minimizing the possibility of damage to the glass surface where it contacts the mould members.

BRIEF SUMMARY OF THE INVENTION

According to the invention there is provided a method of manufacturing curved glass in which the glass is supported on a sag bending mould and passed through a furnace where it is heated to bending temperature by radiant heating from above the glass and sags to conform to the mould shape, characterised in that during the initial heating of the glass on the mould, hot air is directed around the mould beneath the glass to minimise the temperature difference between the mould and the glass.

Usually each mould is mounted in a box on a carriage and the boxes are transported in sequence through a tunnel furnace having a number of heating sections. In one embodiment of the invention hot air is supplied downwardly into each box at least at a first heating section of the furnace, that hot air is deflected sideways beneath the mould in that box and air is extracted upwardly above the centre of the box.

The hot air may be supplied at least at the first three heating sections of the furnace, or at all heating sections, for example five heating sections which constitute the heating part of the furnace.

The invention also comprehends apparatus for manufacturing curved glass in which a sag bending mould is mounted on a carriage which is transported through a tunnel furnace having a number of heating sections, characterised by a hot air supply means at least in a first heating section of the furnace, for directing hot air beneath and around each mould as it supports glass in the furnace.

Such hot air supply means may be embodied in at least the first three heating sections of the furnace, or at every heating section.

In a preferred embodiment the carriage includes a box in which the mould is mounted and deflectors are mounted in the box at either side of the box for directing downward hot air flows beneath and around the mould. Preferably the hot air supply includes supply ducts leading to slots at either side of the roof of each heating section of the furnace, which slots direct hot air downwardly to the deflectors in a box located in that heating section.

The deflectors may be inclined deflector plates fitted into the lower corners of the sides of the box.

Further according to the invention the furnace roof may have a central extract aperture between the slots, which is connected to a fan which directs air extracted from around the mould through a heater to the supply ducts.

The invention also comprehends curved glass, and in particular a pair of curved glass sheets which are to be laminated together to produce a vehicle windscreen, produced by the method of the invention.

BRIEF DESCRIPTION OF THE DRAWINGS

An embodiment of the invention will now be described, by way of example, with reference to the accompanying drawings in which:-

FIG. 1 is a side elevation of a tunnel furnace according to the invention through which a sequence of sag bending moulds are to be transported, FIG. 4 is a diagrammatic upward view of the underneath of a section of the furnace roof.

DETAILED DESCRIPTION

Figure 2:
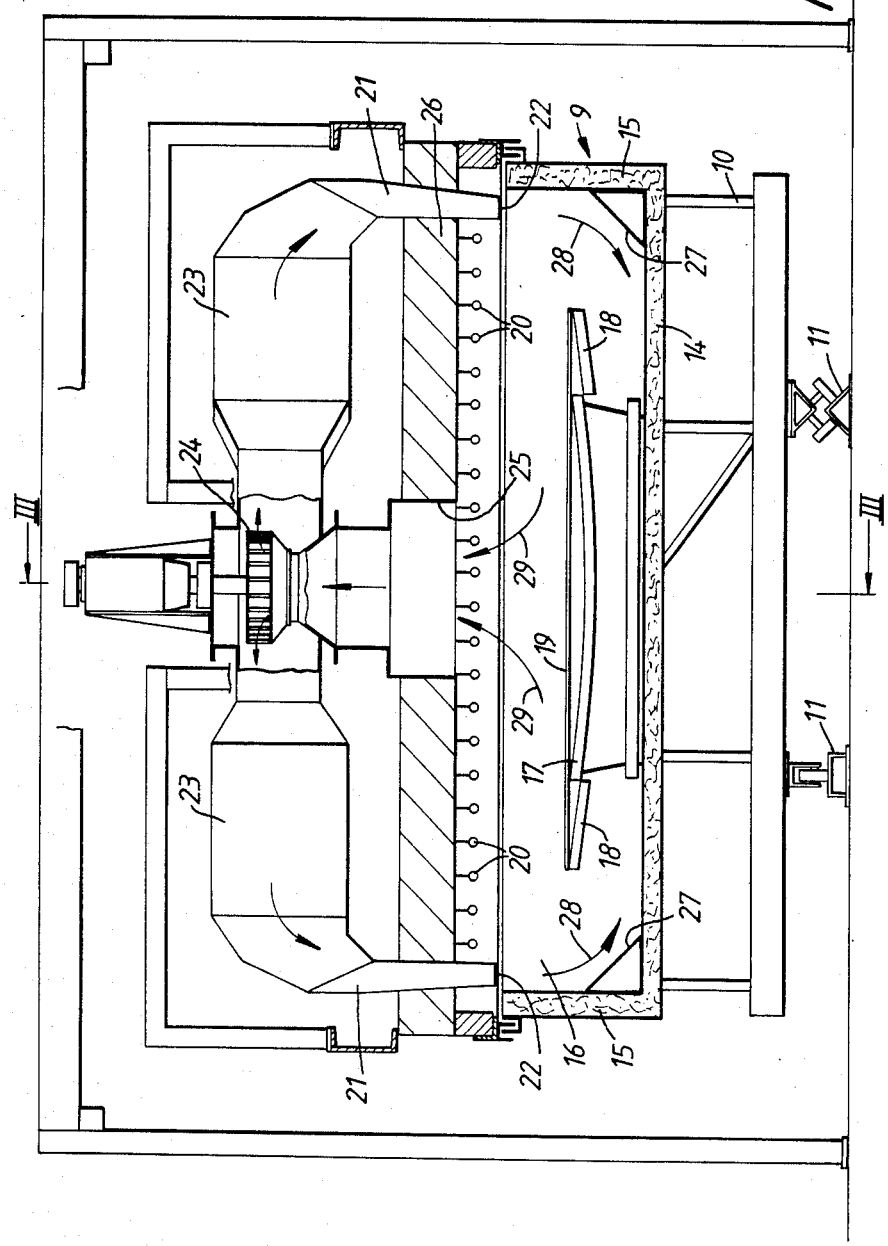
FIG. 2 is a section on line II—II of FIG. 1 showing a box on a carriage carrying a sag bending mould located in a heating section of the furnace.

Referring to FIG. 1 a tunnel furnace is divided into a number of sections leading from a loading/unloading station 1 at the inlet end of the furnace. The first five sections of the furnace constitute together a heating part 2 of the furnace which leads to a pre-bending section 3, followed by a bending section 5 which is maintained at the bending temperature. The next section of the furnace is a transfer section 6 which has open sides to permit an operator to view the bending section 5. The final two sections together form a cooling section 7 which leads to a transfer station 8 at the outlet end of the furnace.

As is customary each mould is mounted in a steel-walled insulated box 9 which is mounted on its carriage 10 which runs on rails 11 which extend right through the furnace from the loading/unloading station 1 to the transfer station 8. At the transfer station 8 each carriage in sequence is lifted by a lift table to an upper return run of rails 12 along which the carriages run as they are pushed back to a lift indicated at 13, which lowers each carriage in turn to the level of the rails at the station 1 ready for unloading and reloading.

The carriages indexed through the furnace in sequence with a fixed residence time, e.g. 90 seconds, in each section of the furnace.

Figure 3:
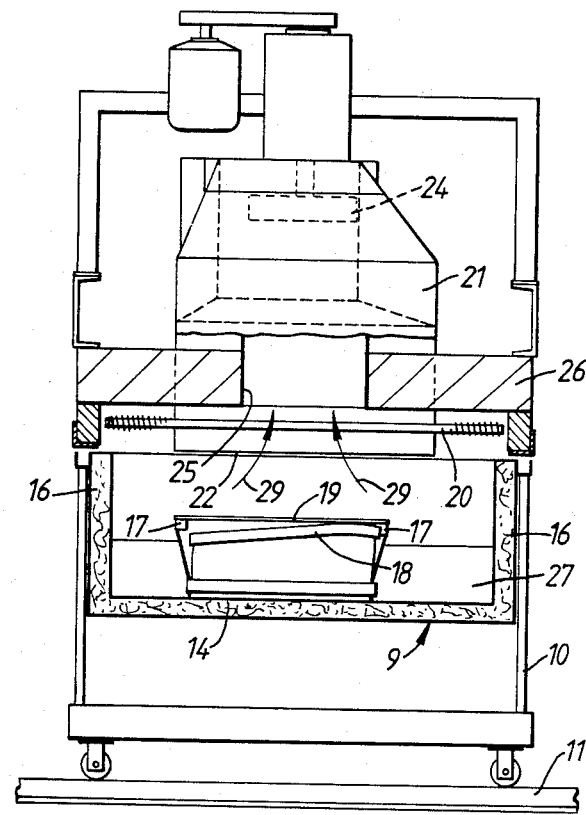
FIG. 3 is a section on line III—III of FIG. 2.

FIGS. 2 and 3 illustrate the mounting of a sag bending mould in each box 9. In this embodiment each box 9 is an enclosed structure having a floor 14, side walls 15 and front and rear walls 16. The floor 14 and the side rear walls 15 and 16 are of double-walled stainless steel with insulation. The sag bending mould is mounted on the floor 14 and includes lateral mould members 17 and end wing pieces 18 which are shown diagrammatically and are of conventional design. The lateral mould members 17 are narrow strip members having an upper edge of curved configuration to which the glass conforms as it sags in the bending section 5 of the furnace. The wing pieces are usually conterpoised so that they can readily swing upwardly under the effect of gravity as the glass sags.

A pair of glass sheets which are to be sag-bent together and are for eventual lamination together to form a vehicle windscreen, are indicated at 19. FIGS. 2 and 3 show how the glass 19 has only points of contact with the predominant points of the mould when the glass is loaded on to the mould at the station 1. Initially the glass will be at room temperature as it is loaded and the mould members in the box will also be at about room temperature, or possibly rather higher depending on the cooling effected during the return run of the carriage.

Each mould in its box 9 is advanced in turn into the five heating sections which together form the heating part 2 of the furnace. The construction of each of these five heating sections of the furnace is identical and is as illustrated in FIGS. 2 and 3.

The roof of each heating section of the furnace carries a pluraltiy of radiant heaters 20 and heat is radiated downwardly through the open top of the box 9 towards the upper surface of the glass 19 which is now stationary in the heating section. The mould members are partially screened from the radiant heat by the glass itself.

In the embodiment illustrated each of the heating sections has a hot air supply including means for directing hot air beneath and around each mould supporting the glass. At either side of the furnace roof in each of the heating sections there are hot air supply ducts 21 leading to slots 22 at either side of the roof. Each of the ducts 21 leads from a heater 23 which is supplied with air by a fan 24 which extracts air through a central extract aperture 25 in the furnace roof 26 between the slots 22.

If the air extracted through the central aperture 25 is hot enough it may not be necessary to provide the heaters 23.

The slots 22 supply hot air downwardly into each box just within the side walls 15 of the box, and inclined deflector plates 27 are fitted into the lower corners of each box where the side walls 15 of the box meet the floor 14. These deflector plates 27 have the effect of deflecting the hot air flows sideways beneath the mould as indicated by the arrows 28. The hot air flows underneath the mould and around the mould members 17, 18 and outwardly around the mould members towards the front and rear walls 16 of the box, and then up to the roof 26 of the furnace for extraction through the central extract aperture 25 as indicated by arrows 29. The hot air heats the lower surface of the supported glass to assist thermal equalisation through the glass thickness, especially when two glass sheets are being bent together, and has the effect of minimizing the temperature difference between the mould members and the glass.

In one example of operation, by employing in the first heating section of the furnace flows of hot air at 300° C. with a rate of flow of 0.47m³/s, it was found that the temperature difference between the mould members and the glass, which otherwise might have been of the order of 100° C., was reduced to about 45° C. to 50° C., and surface flaws on the lower surface of the glass were eliminated.

It is desirable to maintain this reduced temperature difference which has been introduced in the first of the heating sections. To effect this hot air flows 28 around the mould may be provided in at least the first three heating sections. Usually the hot air flows 28 are provided in the second to fifth heating sections of the heating part 2 of the furnace in the same way as in the first heating section.

The carriage then moves to the bending section 3 where the furnace temperature is of the order of 700° C. From the pre-bending section 3 the carriage moves to the bending section 5 where the glass is at a sag bending temperature of about 590° C. to 610° C. with the mould members at a temperature of about 530° C. to 540° C. The minimal temperature difference between the mould and the glass which is established in the first heating section 2 of the furnace, had been maintained throughout the concomitant heating of the mould members and the glass prior to bending.

The indexing cycle time is such that immediately the glass has sag bent to the required configuration of the mould, it is removed from the bending section and cooled and gradually transported step-by-step back to the loading/unloading station 4, by which time it has cooled to about room temperature, or somewhat above.

In each of the heating sections 2, the downward flow of air 28, which are deflected beneath and around the mould, are heated to a temperature commensurate with the temperature of the glass in that furnace section, for example 400° C. in the fourth heating section and 500° C. in the fifth heating section.

The deflector plates 27 are, in the illustrated embooiment, the faces of members of triangular section which are fitted into the corners of the box 9. Deflector plates which are at 45° to the side walls 15 and floor 14 of the box have been found to be effective. Other shapes may be employed, for example deflector members with conrave surfaces which modify the flows beneath and around the mould members.

In another way of carrying out the invention, each box 9 may be of a simplified construction which is of L-shaped cross section having a floor and a front wall only. The boxes abut against each other, so that the front wall of each box in the furnace acts as the rear wall of the preceding box. The side edges of these simplified boxes are close to the side walls of the furnace sections, and at each of the sections of the heating part 2 of the furnace there are air supply slots in the side walls of the furnace, at the level of the moulds, which direct the hot air flows around each mould beneath the glass in similar manner to the flows 28 described with reference to FIGS. 2 and 3.

The convective heating which is employed in carrying out the invention has been found to eliminate the problem of the generation of tensile stresses in the glass due to thermal gradients between the generally hotter glass and the cooler spots caused by localised contact with the mould. Damage caused by the hotter glass sagging on to the colder mould during the final stages of the bending is also avoided. Overall heating efficiency is improved, which has permitted a reduction in the timing of the indexing cycle while still ensuring, when manufacturing pairs of glass sheets to be laminated, that the two sheets conform sufficiently closely to one another and the desired shape.

For example it has been found that operation of the method and apparatus of the invention increases the rate of heating of the glass by a factor of between 2 and 3. It has even been possible to reduce the residence time in each heating section from 90 seconds to 60 seconds by employing the hot air flows in at least the first three heating sections to maintain a tolerable temperature difference between the mould and the glass.

We claim:

1. A method of manufacturing curved glass in which the glass is supported on a sag bending mould, wherein: the mould is mounted in a box on a carriage and passed through a furnace having a number of heating sections where the glass is heated to bending temperature by radiant heating from above the glass and sags to conform to the mould shape; and, during the initial heating of the glass on the mould, hot air is supplied downwardly into the box and deflected around the mould in the box beneath the glass to minimise the temperature difference between the mould and the glass.

2. A method as claimed in claim 1, wherein: a plurality of said boxes in which moulds are mounted are transported on carriages in sequence through a tunnel furnace having a number of heating sections; hot air is supplied downwardly into each box at least at a first heating section of the furnace; that hot air is deflected sideways beneath the mould in the box; and air is extracted upwardly above the centre of the box.

3. A method as claimed in claim 2, wherein the hot air is supplied downwardly into each box and deflected sideways beneath the mould in the box, and wherein air is extracted upwardly above the centre of the box, at least at the first three heating sections of the furnace.

4. Apparatus for manufacturing curved glass, comprising: a sag bending mould mounted in a box on a carriage which is transported through a tunnel furnace having a number of heating sections; hot air supply means, at least in a first heating section of the furnace, for directing hot air downwardly into the box; and deflectors mounted in the box for deflecting the hot air beneath and around each mould as it supports glass in the furnace.

5. Apparatus as claimed in claim 4 including said hot air supply means in at least the first three heating sections of the furnace, for directing hot air downwardly into the box at each of those heating sections.

6. Apparatus as claimed in claim 4, wherein said deflectors are mounted in the box at either side of the box.

7. Apparatus as claimed in claim 6, wherein said hot air supply means includes supply ducts leading to slots at either side of the roof of each heating section of the furnace, which slots direct hot air downwardly to said deflectors.

8. Apparatus as claimed in claim 7, wherein said deflectors are inclined deflector plates fitted into the lower corners of the sides of the box.

9. Apparatus as claimed in claim 7, wherein the furnace roof has a central extract aperture between said slots, which aperture is connected to a fan which directs air extracted from around the mould through heaters to the supply ducts.

10. Apparatus as claimed in claim 5, wherein said deflectors are mounted in the box at either side of the box.

11. Apparatus as claimed in claim 10, wherein said hot air supply means includes supply ducts leading to slots at either side of the roof of each heating section of the furnace, which slots direct hot air downwardly to said deflectors.

12. Apparatus as claimed in claim 11, wherein said deflectors are inclined deflector plates fitted into the lower corners of the sides of the box.

13. Apparatus as claimed in claim 11, wherein the furnace roof has a central extract aperture between said slots, which aperture is connected to a fan which directs air extracted from around the mould through heaters to the supply ducts.

* * * * *